US008276187B2

(12) United States Patent
Gotou

(10) Patent No.: US 8,276,187 B2
(45) Date of Patent: Sep. 25, 2012

(54) INFORMATION PROCESSING SYSTEM

(75) Inventor: Jun Gotou, Tokyo (JP)

(73) Assignee: NEC Corporation, Tokyo (JP)

( * ) Notice: Subject to any disclaimer, the term of this patent is extended or adjusted under 35 U.S.C. 154(b) by 396 days.

(21) Appl. No.: 12/573,543

(22) Filed: Oct. 5, 2009

(65) Prior Publication Data

US 2010/0115584 A1 May 6, 2010

(30) Foreign Application Priority Data

Oct. 30, 2008 (JP) ................................ 2008-279488

(51) Int. Cl.
G06F 17/30 (2006.01)
G06F 7/04 (2006.01)
(52) U.S. Cl. ............... 726/2; 726/26; 713/161; 713/170
(58) Field of Classification Search .................. 713/169; 726/2
See application file for complete search history.

(56) References Cited

U.S. PATENT DOCUMENTS

| | | | | |
|---|---|---|---|---|
| 2005/0015594 | A1* | 1/2005 | Ashley et al. ................ | 713/168 |
| 2006/0053300 | A1* | 3/2006 | Noguchi ........................ | 713/182 |
| 2006/0069917 | A1* | 3/2006 | Martin et al. ................. | 713/175 |
| 2006/0282884 | A1* | 12/2006 | Pomerantz ........................ | 726/5 |
| 2009/0083547 | A1* | 3/2009 | Shimizu et al. ............... | 713/193 |
| 2009/0228965 | A1* | 9/2009 | Klippgen ......................... | 726/6 |
| 2012/0123947 | A1* | 5/2012 | Jones ............................ | 705/65 |

FOREIGN PATENT DOCUMENTS

| | | | |
|---|---|---|---|
| JP | 2001175599 | A | 6/2001 |
| JP | 2002027545 | A | 1/2002 |
| JP | 2006048493 | A | 2/2006 |
| JP | 2006127127 | A | 5/2006 |
| JP | 2006343943 | A | 12/2006 |
| JP | 2007019981 | A | 1/2007 |
| JP | 2007164273 | A | 6/2007 |
| JP | 2007200316 | A | 8/2007 |
| JP | 2007226545 | A | 9/2007 |
| JP | 2007280255 | A | 10/2007 |

OTHER PUBLICATIONS

Japanese Office Action for JP2008-279488 issued Aug. 3, 2010.
"Special on Products [Security]", Mobile Media Magazine, vol. 8, No. 1, Jan. 2000, pp. 28-35.
Japanese Office Action for JP2008-279488 issued Oct. 26, 2010.

* cited by examiner

*Primary Examiner* — Taghi Arani
*Assistant Examiner* — Mohammad Rahman

(57) ABSTRACT

An information processing system includes a client device and a server system. The client device executes an application program as a confidential process for performing processing based on confidential information. When a transmission request asking for transmission of confidential information is generated by the application program being executed, the client device transmits, to the server system, the transmission request and confidential process information indicating that the process in which the transmission request was generated is a confidential process. When the server system receives the transmission request and the confidential process information from the client device, the server system transmits stored confidential information in accordance with the received transmission request.

13 Claims, 16 Drawing Sheets

FIG.3

| APPLICATION PROGRAM SPECIFYING INFORMATION | COMMUNICATION PROTOCOL SPECIFYING INFORMATION |
|---|---|
| AP1 | CIFS |
| AP2 | HTTP |
| AP3 | CIFS |
| ... | ... |

FIG.4

| USER ID INFORMATION | PASSWORD INFORMATION |
|---|---|
| U1 | nueGEh&7 |
| U2 | %2dty0@u |
| ... | ... |

FIG.6

| USER ID INFORMATION | DEVICE SPECIFYING INFORMATION | RECEPTION NUMBER INFORMATION |
|---|---|---|
| U1 | 10.12.13.14 | 10 |
| U2 | 10.12.13.25 | 0 |
| ... | ... | ... |

US 8,276,187 B2

INFORMATION PROCESSING SYSTEM

INCORPORATION BY REFERENCE

This application is based upon and claims the benefit of priority from Japanese patent application No. 2008-279488, filed on Oct. 30, 2008, the disclosure of which is incorporated herein in its entirety by reference.

TECHNICAL FIELD

The present invention relates to an information processing system including a server device which stores confidential information and a client device which performs processing based on the confidential information received from the server device.

BACKGROUND ART

An information processing device capable of executing an application program as a normal process or a confidential process has been known.

As one example of such an information processing device, a device disclosed in Japanese Patent Laid-Open Publication No. 2006-127127 (Patent Document 1) is adapted such that when an application program is executed as a confidential process, if a write request asking for storage of data is generated by the confidential process, data is stored in a confidential region of the storage device. On the other hand, when an application program is executed as a normal process in the information processing device, if a write request is generated by the normal process, data is stored in a normal region which is different from the confidential region of the storage device.

[Patent Document 1] JP 2006-127127 A

Now, it is assumed that the information processing device described above is applied to a client device receives confidential information, stored in a server system, from the server system and performs processing based on the received confidential information. In this case, the client device transmits, to the server system, a transmission request asking for transmission of the confidential information. When the server system receives the transmission request, the server system transmits the stored confidential information to the client device in accordance with the received transmission request.

However, in an information processing system in which the information processing device is applied, when the server system transmits the confidential information to the client device, the server system is not able to recognize whether the confidential information is used in a confidential process or a normal process. This means that in an information processing system to which the information processing device is applied, there has been a problem that the server system is not able to properly respond to a transmission request from the client device.

SUMMARY

An exemplary object of the present invention is to provide an information processing system capable of solving the problem described above, that is, a problem that a server system is not able to properly respond to a transmission request from a client device.

In order to achieve the exemplary object, an information processing system according to an exemplary aspect of the present invention includes a server system and a client device.

The client device includes a confidential process execution unit which executes an application program as a confidential process for performing processing based on confidential information, and when a transmission request asking for transmission of the confidential information is generated by the application program being executed, transmits the transmission request and confidential process information indicating that a process in which the transmission request was generated is a confidential process, to the server system.

The server system includes a confidential information storage unit which stores the confidential information, and a confidential information transmission unit which, when receiving the transmission request and the confidential process information from the client device, transmits the stored confidential information to the client device in accordance with the received transmission request.

Further, a server system according to another aspect of the present invention includes a confidential information storage unit which stores confidential information, and a confidential information transmission unit which, when receiving a transmission request asking for transmission of the confidential information and confidential process information indicating that a process in which the transmission request was generated is a confidential process, transmits the stored confidential information in accordance with the received transmission request.

Further, a client device according to another aspect of the present invention includes a confidential process execution unit which executes an application program as a confidential process for performing processing based on confidential information, and when a transmission request asking for transmission of the confidential information is generated by the application program being executed, transmits the transmission request and confidential process information indicating that a process in which the transmission request was generated is a confidential process.

An information processing method according to another aspect of the present invention includes executing an application program as a confidential process for performing processing based on confidential information, and when a transmission request asking for transmission of the confidential information is generated by the application program being executed, transmitting the transmission request and confidential process information indicating that a process in which the transmission request was generated is a confidential process, and when receiving the transmission request and the confidential process information, transmitting the stored confidential information in accordance with the received transmission request received.

A program for a server device according to another aspect of the present invention is a program for realizing, in the server device, a confidential information transmission unit which, when receiving a transmission request asking for transmission of confidential information stored in a storage device and confidential process information indicating that a process in which the transmission request was generated is a confidential process, transmits the stored confidential information in accordance with the received transmission request.

Further, a program for a client device according to another aspect of the present invention is a program for realizing, in the client device, a confidential process execution unit which executes an application program as a confidential process for performing processing based on confidential information, and when a transmission request asking for transmission of the confidential information is generated by the application program being executed, transmits the transmission request and confidential process information indicating that a process in which the transmission request was generated is a confidential process.

As the present invention is configured as described above, the server system is able to properly respond to a transmission request from the client device.

BRIEF DESCRIPTION OF THE DRAWINGS

FIG. 3 is a communication protocol table in which application program specifying information and protocol specifying information are associated;

FIG. 4 is a user authentication table in which user identification information and password information are associated;

FIG. 6 is a reception number table in which the user identification information, a device specifying information, and reception number information are associated;

EXEMPLARY EMBODIMENT

Exemplary embodiments of an information processing system, a server system, a client device, an information processing method, a program for a server device, and a program for a client device, according to the present invention, will be described below with reference to FIGS. 1 to 16.

First Exemplary Embodiment

Figure 1:
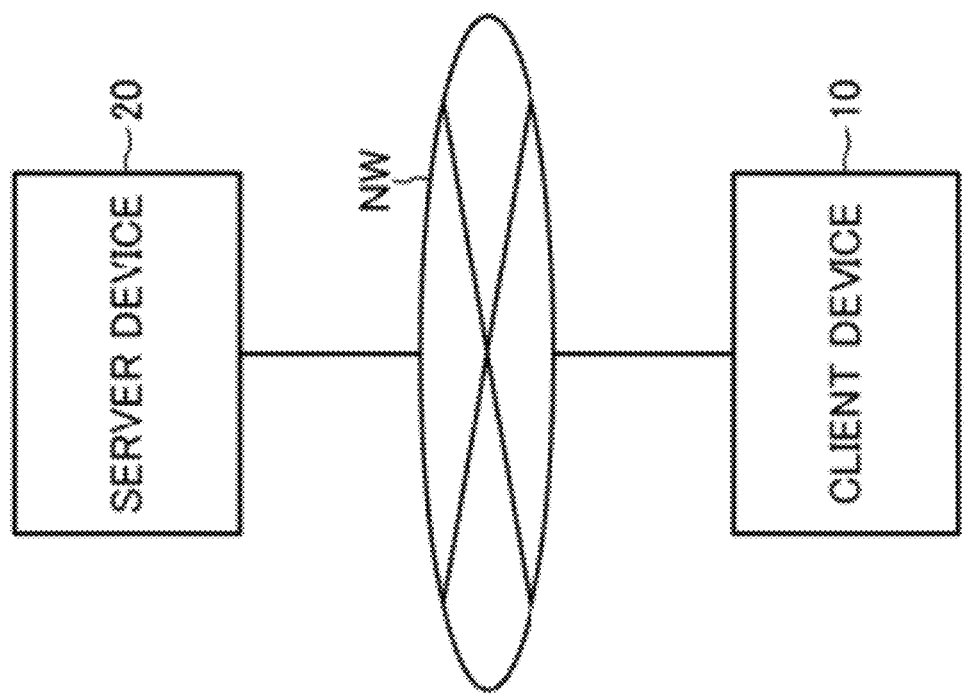
FIG. 1 is a diagram showing the schematic configuration of an information processing system according to a first exemplary embodiment of the present invention.

As shown in FIG. 1, an information processing system 1 according to a first exemplary embodiment includes a client device 10 and a server device 20 constituting a server system. The client device 10 and the server device 20 are communicably connected to each other over a communication network NW (intranet in this embodiment).

The client device 10 is a personal computer. The client device 10 includes a central processing unit (CPU), storage devices (memory and hard disk drive (HDD)), an input device, and an output device, although not shown.

The output device has a display. The output device displays images including text and graphics on the display based on image information output from the CPU. The input device has a keyboard and a mouse. The client device 10 is adapted such that information is input therein according to an operation by a user through a keyboard and a mouse.

The client device 10 is adapted such that functions described below are realized by the CPU executing programs stored in the storage devices.

The server device 20 includes a CPU and storage devices, not shown, as the client device 10. The server device 20 is adapted to realize functions described below by the CPU executing programs stored in the storage devices, as the client device 10.

Figure 2:
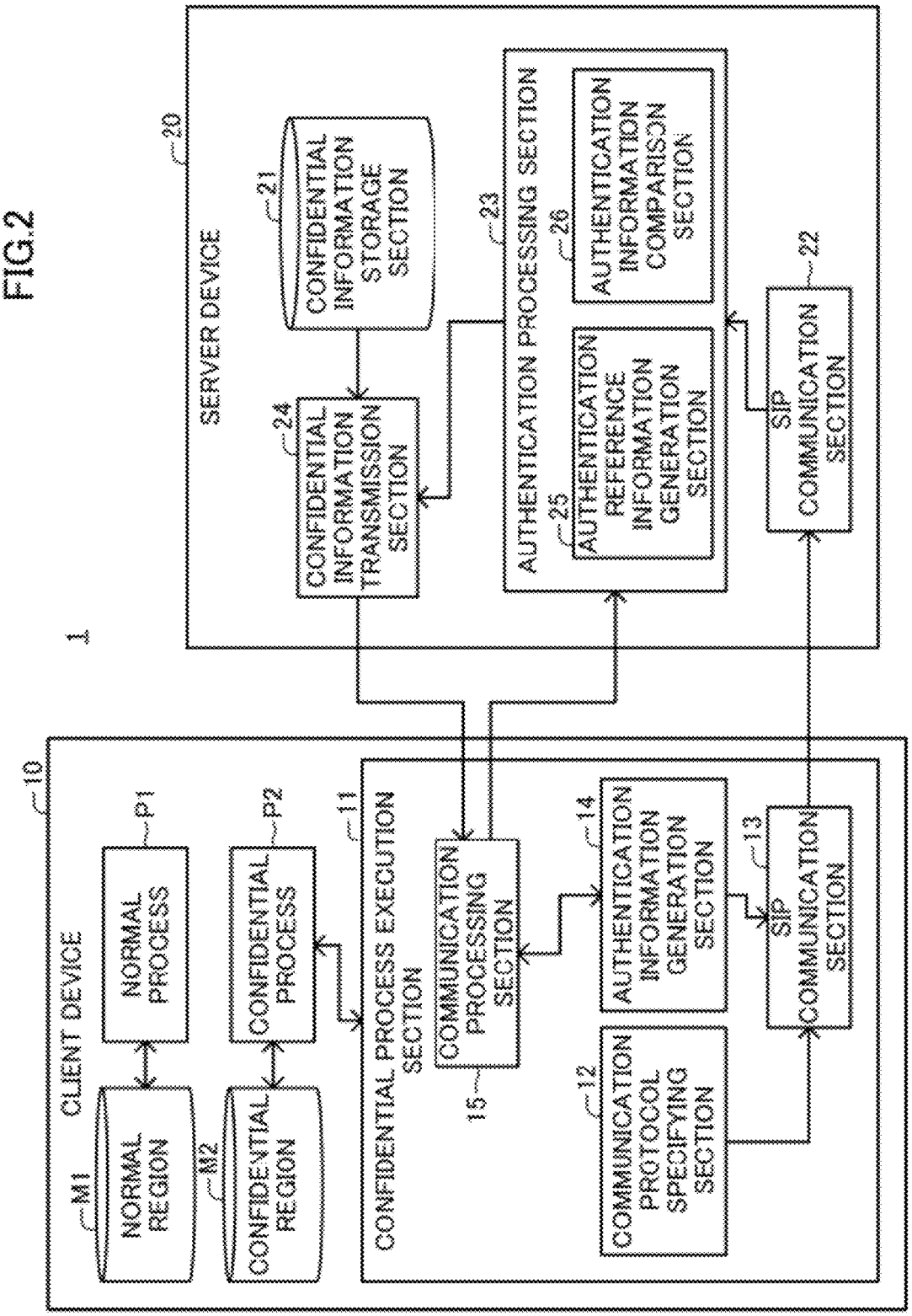
FIG. 2 is a block diagram showing the schematic functions of the information processing system shown in FIG. 1.

FIG. 2 is a block diagram showing the functions of the information processing system 1 configured as described above. These functions are realized by the CPU of the client device 10 executing the programs and the like shown in the flowcharts of FIGS. 8 and 10 described in detail below, and by the CPU of the server device 20 executing the programs and the like shown in the flowcharts of FIGS. 9 and 11 described in detail below.

As shown in FIG. 2, the functions of the client device 10 include a function of executing an application program stored in the storage device as a normal process P1. When a write request asking for storage of data is generated by the application program executed as the normal process P1, the client device 10 stores the data in a normal region M1 of the storage device.

The functions of the client device 10 also include a function of executing an application program stored in the storage device as a confidential process P2. When a write request asking for storage of data is generated by the application program executed as the confidential process P2, the client device 10 stores the data in a confidential region M2, which is different from the normal region M1, in the storage device.

More specifically, the functions of the client device 10 includes a confidential process execution section (confidential process execution unit) 11. The confidential process execution section 11 includes a communication protocol specifying section 12, an SIP communication section 13, an authentication information generation section 14, and a communication processing section 15.

The confidential process execution section 11 receives an execution instruction input by a user. The execution instruction includes application program specifying information for specifying an application program, and is information instructing execution of the application program.

When receiving the execution instruction, the confidential process execution section 11 executes the application program specified by the execution instruction as the confidential process P2.

When a write request asking for storage of data is generated by the application program executed as the confidential process P2, the confidential process execution section 11 stores the data in the confidential region M2 in the storage device. Then, the confidential process execution section 11 deletes the data stored in the confidential region M2 when the confidential process P2 ends.

The communication protocol specifying section 12 stores, in the storage device, a communication protocol table in which application program specifying information (e.g., "AP1", "AP2", "AP3") and protocol specifying information for specifying a communication program used for performing communications by the application program specified by the application program specifying information, as shown in FIG. 3.

For example, the communication protocols include CIFS (Common Internet File System), and HTTP (HyperText Transfer Protocol).

The communication protocol specifying section 12 acquires protocol specifying information associated with the application program specifying information included in the received execution instruction, in the communication protocol table.

The SIP communication section 13 establishes a session with the server device 20 in accordance with SIP (Session Initiation Protocol). It should be noted that the SIP is defined in the RFC (Request for Comments) 3261 and the like by the IETF (Internet Engineering Task Force). The SIP communication section 13 has an SIP agent function.

The SIP communication section 13 transmits the protocol specifying information acquired by the communication protocol specifying section 12 to the server device 20 through the established session.

As described above, before transmitting a transmission request, the client device 10 transmits the protocol specifying information for specifying the communication protocol used for transmitting the transmission request, to the server device 20. The transmission request includes information for specifying confidential information, and is information indicating that transmission of the confidential information is requested.

As shown in FIG. 4, the confidential process execution section 11 also stores a user authentication table in which user identification information (user ID, e.g., "U1", "U2", etc) for identifying users and password information (e.g., "nueGEh&7", "%2dty0@u", etc.) indicating character strings as passwords are associated with each other. The function process execution section 11 receives the user identification information (user ID) and the password information input by a user.

Then, the confidential process execution section 11 performs a user authentication process for determining whether user identification information and password information, which are the same as the received user identification information and password information, are associated in the user authentication table (which means that the user is an authorized user).

When the confidential process execution section 11 determines that the user is an authorized user, the SIP communication section 13 transmits the received user identification information to the server device 20 through the established session. The server device 20 acquires password information associated with the user identification information as authentication base information which works as the basis for generating authentication information, as described below. This means that the client device 10 substantially transmits authentication base information to the server device 20.

Figure 5:
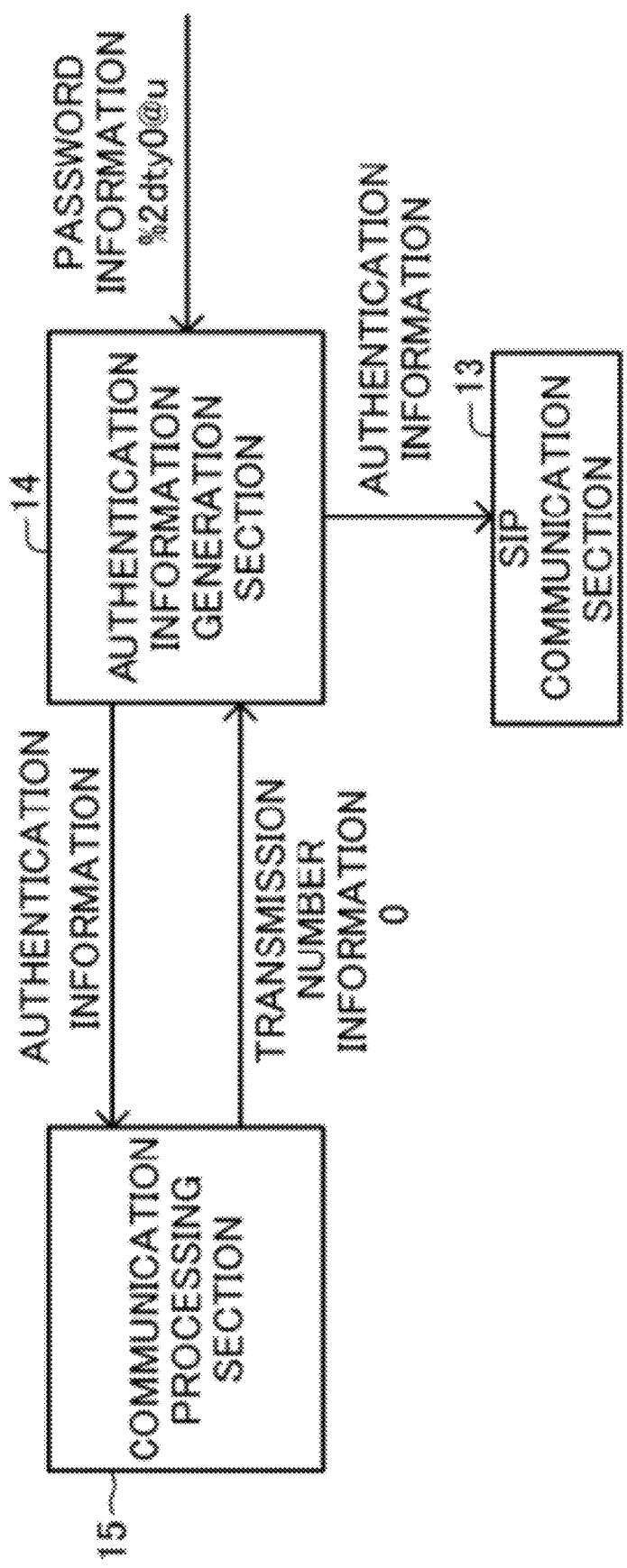
FIG. 5 is an illustration schematically showing an operation of generating authentication information by an authentication information generation section.

When the confidential process execution section 11 determines that the user is an authorized user, the authentication information generation section 14 acquires the received password information as authentication base information which works as the basis for generating authentication information, as shown in FIG. 5. Then, the authentication information generation section 14 generates authentication information based on the acquired authentication base information and transmission number information.

In this exemplary embodiment, the authentication information generation section 14 generates authentication information in accordance with a method (An HMAC (Hashed Message Authentication Codekey)-Based One-Time Password Algorithm) defined in RFC4226 by the IETF. That is, the authentication information in this exemplary embodiment is information also called as one-time password. The authentication information generation section 14 uses the authentication base information as a secret key of this method, and also uses the transmission number information as a counter value. It should be noted that the authentication information generation section 14 may generates authentication information in accordance with another method.

The transmission number information is information indicating the number of times that transmission requests generated by the confidential process P2 are transmitted to the server device 20. The transmission number information is generated by the communication processing section 15. This means that the client device 10 generates different information as authentication information each time it transmits a transmission request.

If the authentication information generated by the authentication information generation section 14 is generated based on transmission number information indicating "0", the SIP communication section 13 transmits the authentication information to the server device 20 through the established session.

If a transmission request asking for transmission of confidential information is generated by an application program being executed as the confidential process P2, the communication processing section 15 transmits, to the server device 20, the transmission request, confidential process information indicating that the process in which the transmission request was generated is a confidential process, and the user identification information received by the confidential process execution section 11. In this step, the communication processing section 15 uses a communication protocol which is the same as the communication protocol used by the application program. Further, in this exemplary embodiment, the confidential process information is authentication information generated by the authentication information generation section 14.

Further, the communication processing section 15 updates the transmission number information such that the number of times indicated by the transmission number information is incremented by one each time the communication processing section 15 transmits the transmission request. The communication processing section 15 transmits the confidential information received from the server device 20 to the confidential process P2. It should be noted that the confidential process P2 may be configured as to directly receive confidential information from the server device 20 without going through the communication processing section 15.

In this exemplary embodiment, the communication processing section 15 is provided as a hook module to be executed when a communication event of the confidential process P2 is caught. The communication processing section 15 may be provided as a communication driver for the confidential process P2 to perform communications.

Meanwhile, the functions of the server device 20 include a confidential information storage section (confidential information storage unit, confidential information storage processing unit, confidential information storage processing step) 21, an SIP communication section 22, an authentication processing section (authentication processing unit) 23, and a confidential information transmission section (confidential information transmission unit) 24.

The confidential information storage unit 21 stores confidential information in the storage device of the server device 20.

The SIP communication section 22 establishes a session with the client device 10 in accordance with SIP. The SIP communication section 22 receives information transmitted from the client device 10 through the established session. The SIP communication section 22 includes an SIP server function and an SIP agent function. It is also acceptable that a server device other than the server device 20 has the SIP server function and the SIP communication section 22 does not include the SIP server function.

The authentication processing section 23 includes an authentication base information generation section 25 and an authentication information comparison section 26. The authentication processing section 23 stores a user authentication table, which is the same as the user authentication table stored in the storage device of the client device 10, in the storage device of the server device 20.

When the user identification information, the protocol specifying information, and the authentication information are received by the SIP communication section 22, the authentication processing section 23 acquires password information associated with the user identification information in the user authentication table, as authentication base information. Then, the authentication reference information generation section 25 generates authentication reference information based on the acquired authentication base information and the reception number information indicating "0", in accordance with the same method as that of the authentication information generation section 14.

Then, the authentication information comparison section 26 determines whether or not the authentication information received by the SIP communication section 22 and the authentication reference information generated by the authentication reference information generation section 23 coincide with each other. Then, when the authentication information comparison section 26 determines that the authentication information and the authentication reference information coincide with each other, the authentication processing section 23 adds new information to the reception number table stored in the storage device of the server device 20, as shown in FIG. 6.

More specifically, the authentication processing section 23 adds information in which the user identification information received by the SIP communication section 22, the device specifying information (in this exemplary embodiment, information indicating the IP (Internet Protocol) address of the client device 10) for specifying the client device 10 which transmitted the user identification information, and the reception number information indicating "0" as an initial value, are associated.

Further, the authentication processing section 23 associates, and stores in the storage device, the device specifying information and the protocol specifying information received by the SIP communication section 22. The authentication processing section 23 blocks communications which are from the client device 10 specified by the stored device specifying information and are performed in accordance with a communication protocol other than a communication protocol specified by the protocol specifying information stored while being associated with the device specifying information.

Figure 7:
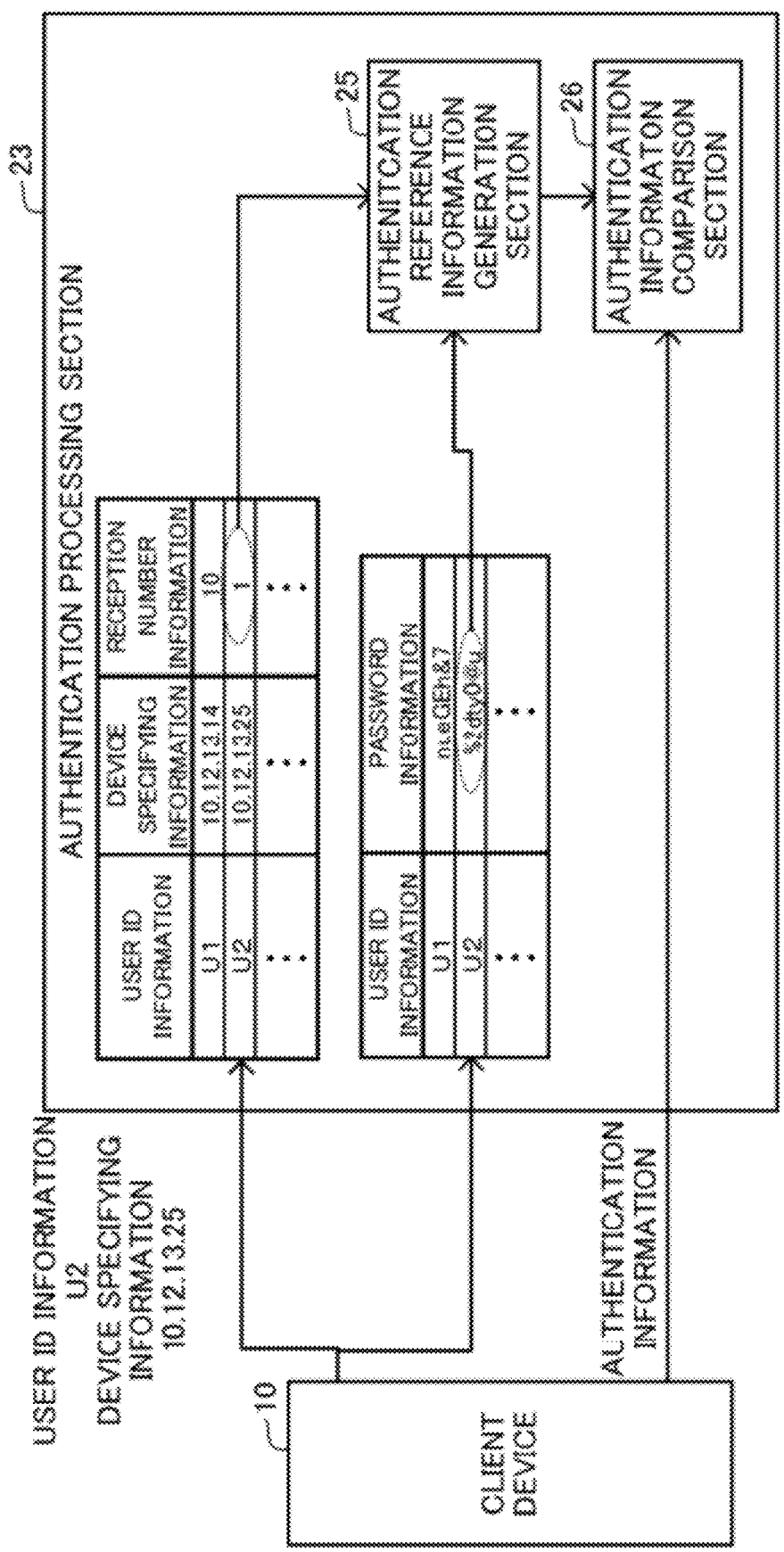
FIG. 7 is an illustration schematically showing an operation of process authentication processing by an authentication processing section.

Further, as shown in FIG. 7, the authentication processing section 23 receives a transmission request, the user identification information, and the authentication information, from the client device 10. When the authentication processing section 23 receives a transmission request from the client device 10, the authentication processing section 23 updates the received user identification information, the device specifying information for specifying the client device 10 which transmitted the transmission request, and the reception number information associated in the reception number tables, such that the number of times indicated by the reception number information is incremented by one.

Then, the authentication processing section 23 acquires password information associated with the user identification information in the user authentication table, as authentication base information. Further, the authentication reference information generation section 25 generates authentication reference information based on the acquired authentication base information and the updated reception number information in accordance with the same method as that of the authentication information generation section 14.

Then, the authentication information comparison section 26 performs an authentication process for determining whether or not the authentication information received by the authentication processing section 23 and the authentication reference information generated by the authentication reference information generation section 25 coincide with each other. It should be noted that the authentication information comparison section 26 determines that the received authentication information is valid information when the authentication information and the authentication reference information coincide with each other.

When the authentication information comparison section 26 determines that the received authentication information is valid information, the confidential information transmission section 24 transmits the confidential information stored in the confidential information storage section 32 according to the received transmission request, to the client device 10. In this exemplary embodiment, the confidential information transmission section 24 includes a function of transmitting confidential information in accordance with CIFS (function as a file server) and a function of transmitting confidential information in accordance with HTTP (function as a web server).

Next, an operation of the information processing system 1 will be described in detail.

Figure 8:
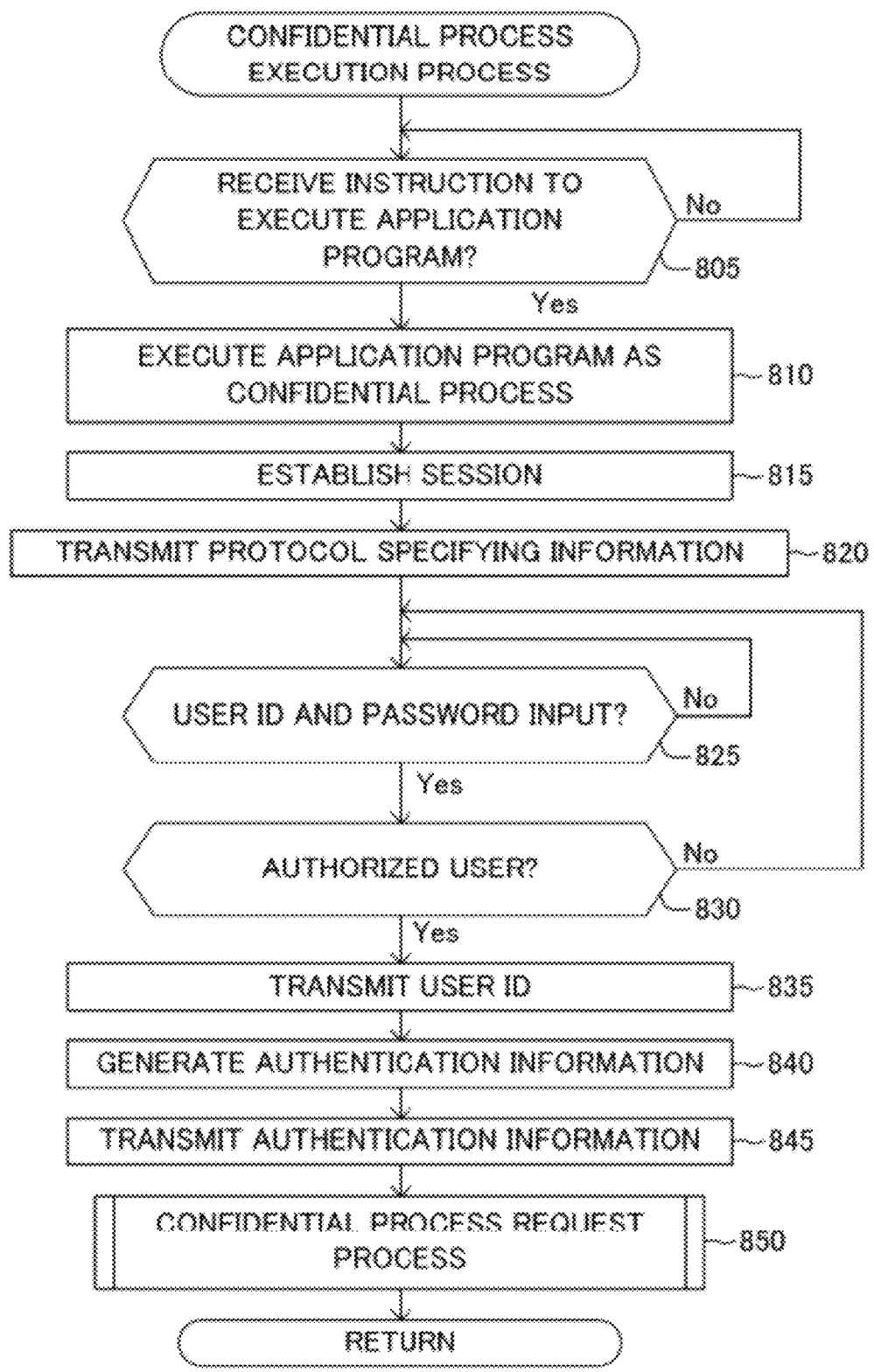
FIG. 8 is a flowchart showing a confidential process execution processing program executed by a CPU of the client device shown in FIG. 1.

The CPU of the client device 10 is adapted to execute a confidential process execution processing program shown in the flowchart of FIG. 8, in accordance with an activation instruction input by a user.

More specifically, when the CPU starts processing of the confidential process execution program, the CPU waits until it receives an execution instruction of the application program at step 805.

In this state, a user inputs an execution instruction. Thereby, the CPU determines to be "Yes" and goes to step 810, and executes the application program specified by the execution instruction as a confidential process (step A1 in FIG. 12, a part of confidential process execution step).

Figure 12:
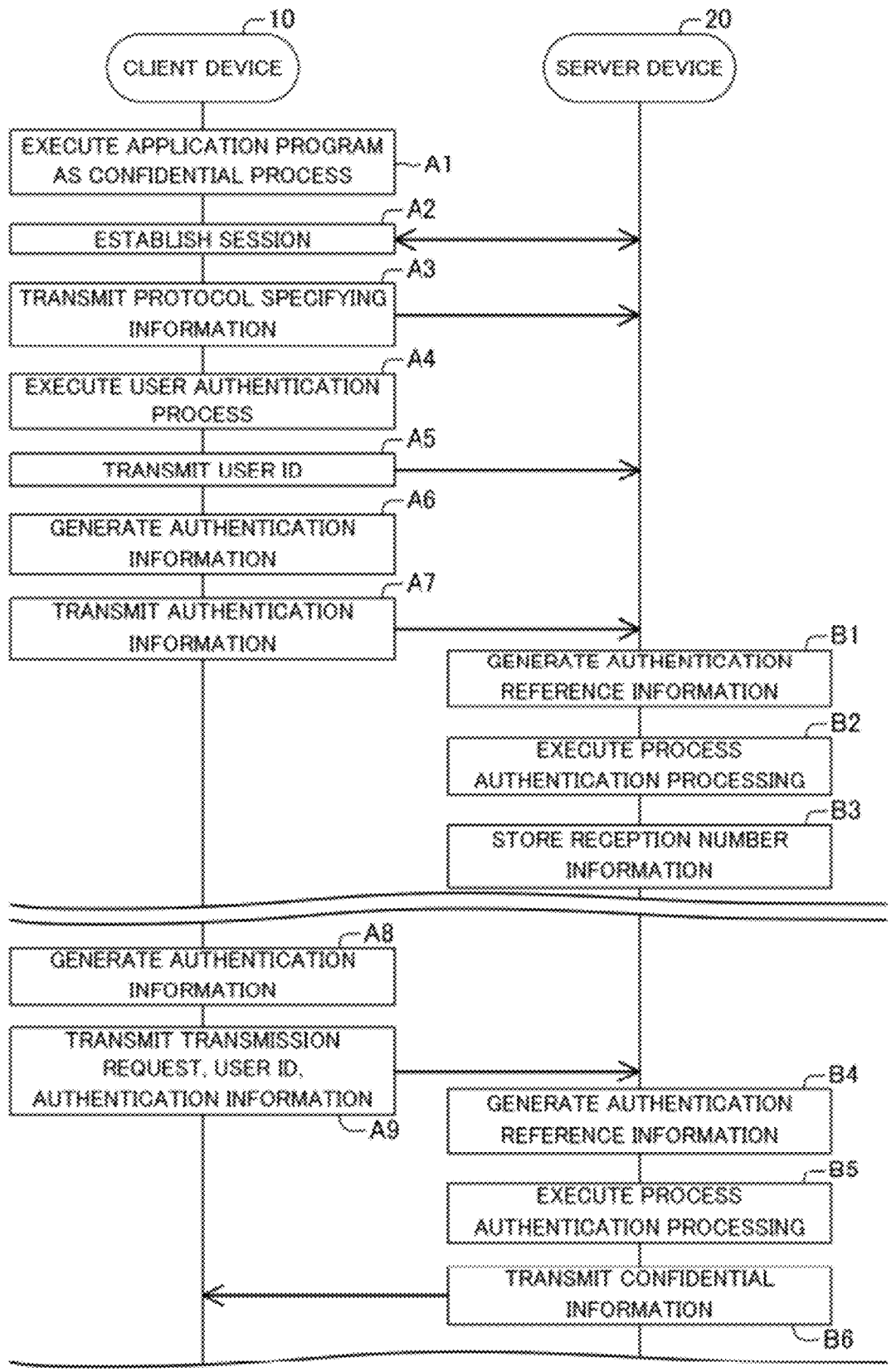
FIG. 12 is a sequence chart showing an operation of the information processing system shown in FIG. 1.

Then, the CPU establishes a session with the server 20 in accordance with SIP (step 815 in FIG. 8, step A2 in FIG. 12). Then, the CPU acquires protocol specifying information associated with the application program specifying information, included in the execution instruction, in the communication protocol table. Further, the CPU transmits the acquired protocol specifying information to the server device 20 through the established session in accordance with SIP (step 820 in FIG. 8, step A3 in FIG. 12).

Then, the CPU displays an image prompting an input of user identification information (user ID) and password information on the display. Then, the CPU waits until it receives an input of user identification information and password information (step 825).

In this state, the user inputs user identification information and password information. Thereby, the CPU determines to be "Yes" and goes to step 830, and performs a user authentication process for determining whether or not user identification information and password information which are the same as the received user identification information and the password information are associated with each other in the user authentication table (that is, the user is an authorized user) (step A4 in FIG. 12).

Now, description will be continued below under an assumption that user identification information and password information, which are the same as the user identification information and the password information associated with each other in the user authentication table, are input by the user.

In that case, the CPU determines to be "Yes" and goes to step 835. If the user identification information and the password information, which are the same as the user identification information and the password information input by the user, are not associated with each other in the user authentication table, the CPU determines to be "No" and returns to step 825.

Then, at step 835, the CPU transmits the received user identification information to the server device 20 through the established session (step A5 in FIG. 12) in accordance with SIP. Then, the CPU acquires the received password information as authentication base information, and generates authentication information based on the acquired authentication base information and the transmission number information indicating "0" as the initial value (step 840 in FIG. 8, step A6 in FIG. 12). The CPU also stores the transmission number information indicating "0" as the initial value in the storage device.

Then, the CPU transmits the generated authentication information to the server device 20 through the established session (step 845 in FIG. 8, step A7 in FIG. 12). Then, at step 850, the CPU executes the confidential process request processing program shown in FIG. 10 in order to execute confidential process request processing. It should be noted that processing of the confidential process request processing program will be described later.

Figure 9:
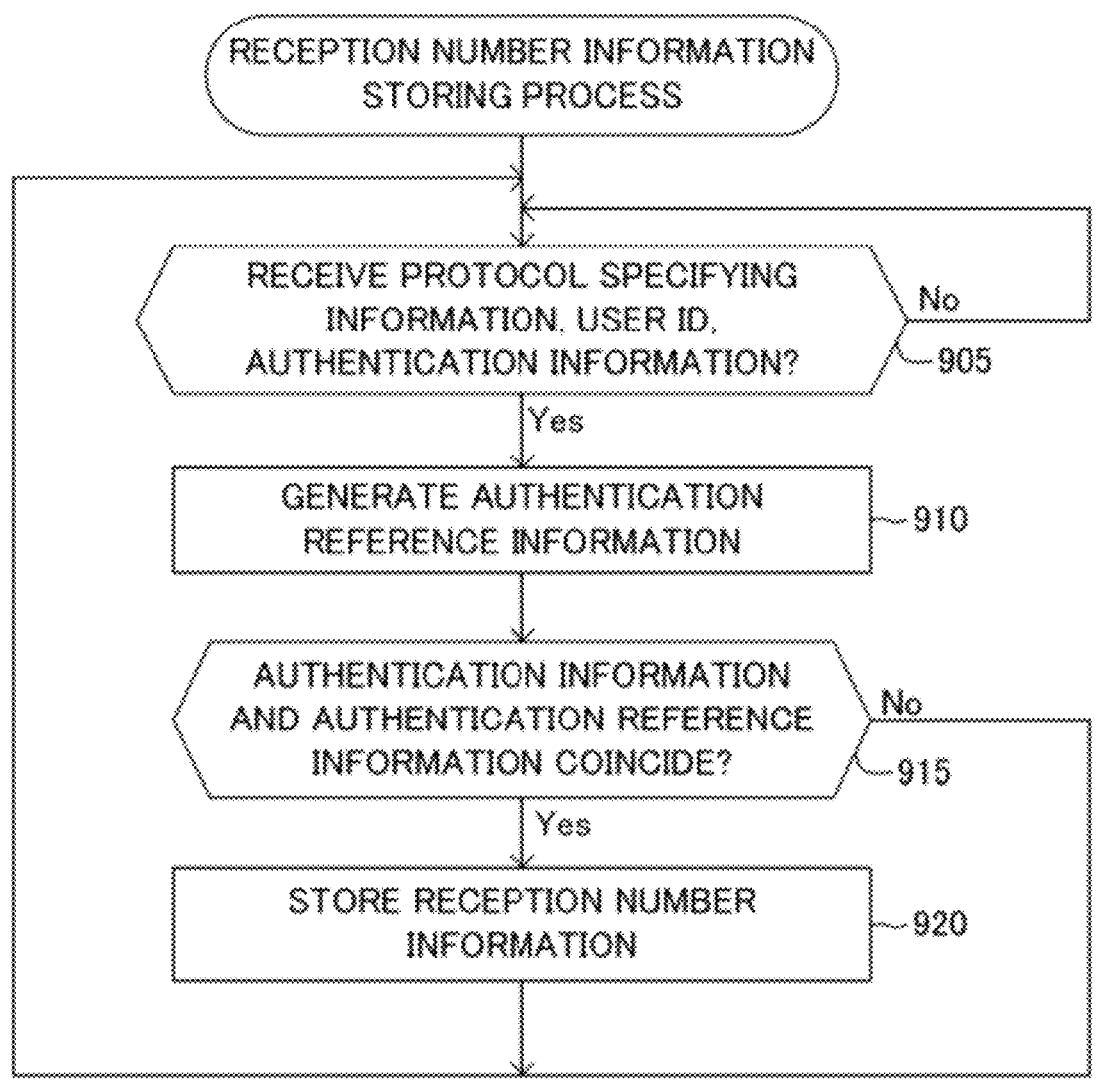
FIG. 9 is a flowchart showing a reception number information storage processing program executed by a CPU of the server device shown in FIG. 1.

On the other hand, the CPU of the server device 20 is adapted to execute the reception number information storage processing program shown in the flowchart of FIG. 9 only once when the server device 20 is activated.

More specifically, after the CPU has started processing of the reception number information storage processing program, at step 905, the CPU waits until it receives the protocol specifying information, the user identification information, and the authentication information, from the client device 10.

Then, when the server device 20 receives the protocol specifying information, the user identification information, and the authentication information, the CPU of the server device 20 determines to be "Yes" and goes to step 910.

Then, the CPU acquires password information associated with the received user identification information in the user authentication table as authentication base information, and generates authentication reference information based on the acquired authentication base information and the reception number information indicating "0" (step B1 in FIG. 12).

Then, the CPU performs a process authentication process for determining whether or not the received authentication information and the generated authentication reference information coincide with each other (step 915 in FIG. 9, step B2 in FIG. 12).

Now, description will be continued below under an assumption that the authentication information and the authentication reference information coincide with each other. In that case, the CPU determines to be "Yes" and goes to step 920. If the authentication information and the authentication reference information do not coincide with each other, the CPU determines to be "No" and returns to step 905, and repeatedly performs the processing from step 905 to step 920.

Then, at step 920, the CPU adds new information in which the received user identification information, device specifying information for specifying the client device 10 which transmitted the user identification information, and the reception number information indicating "0" as an initial value, in the reception number table (additionally stores in the storage device, step B3 in FIG. 12). The CPU also associates, and stores in the storage device, the device specifying information and the received protocol specifying information.

Then, the CPU returns to step 905, and repeatedly performs the processing from step 905 to from 920.

Next, processing of the confidential process request processing program will be described.

The CPU of the client device 10 waits until a processing request is generated by the confidential process at step 1005. In this case, the processing request may be a transmission request, a write request, or an ending request. A transmission request is information indicating a request for transmission of confidential information. A write request is information indicating a request for storage of data. An ending request is information indicating a request for ending a confidential process.

Now, Description will be continued under an assumption that the application program being executed as a confidential process generates a transmission request.

In that case, the CPU determines to be "Yes" and goes to step 1010, and determines whether or not the generated processing request is a transmission request.

According to the assumption described above, the CPU determines to be "Yes" and goes to step 1015, and updates the transmission number information stored in the storage device of the client device 10 such that the number of times indicated by the transmission number information is incremented by one.

Figure 10:
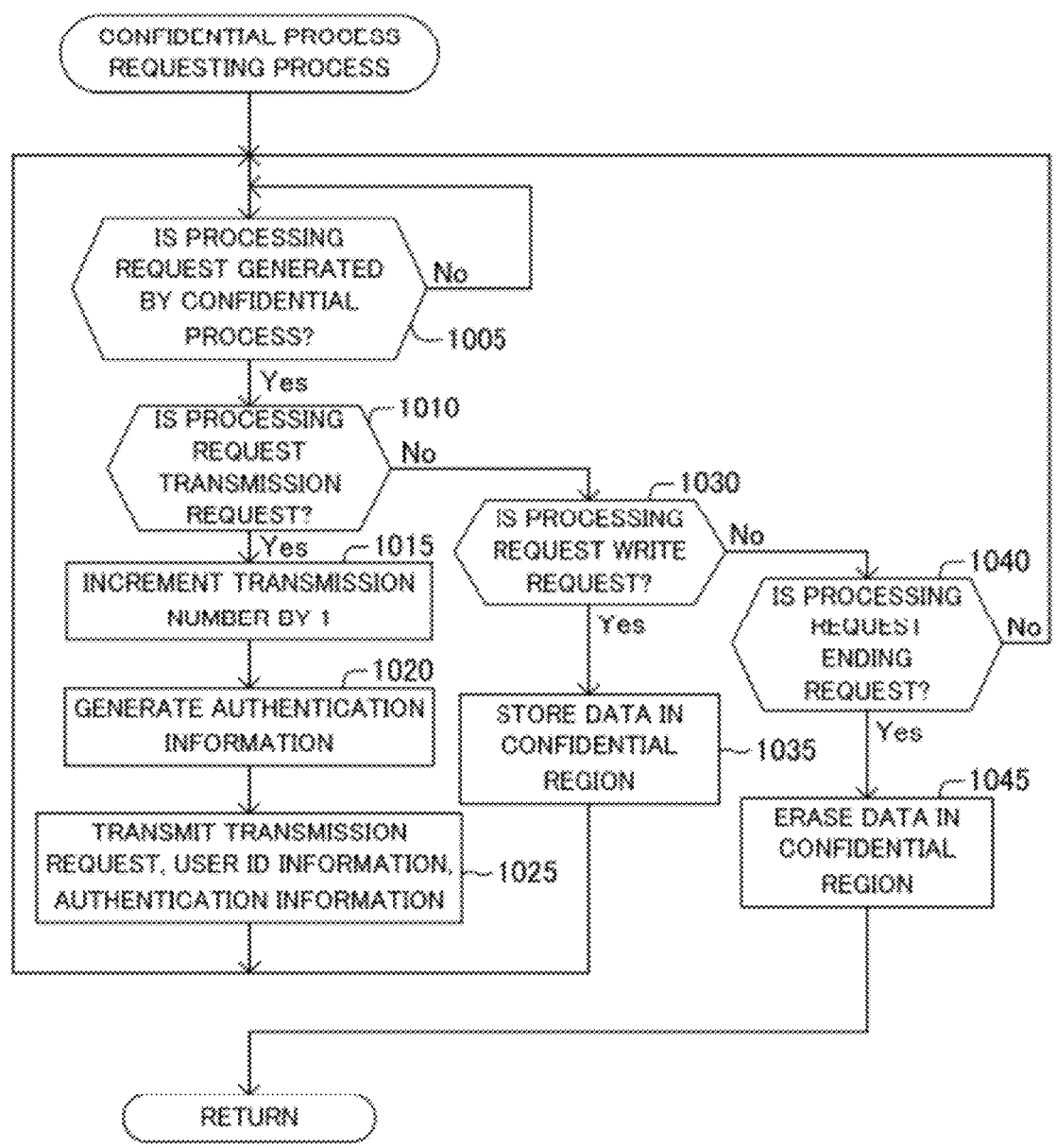
FIG. 10 is a flowchart showing a confidential process request processing program executed by the CPU of the client device shown in FIG. 1.

Then, the CPU generates authentication information based on the password information as the authentication base information received at step 825 and the updated transmission number information (step 1020 in FIG. 10, step A8 in FIG. 12).

Then, the CPU transmits the generated transmission request, the user identification information received at step 825, and the generated authentication information, to the server device 20 in accordance with a communication protocol which has been planned to be used for transmitting the transmission request by the application program (step 1025 in FIG. 10, step A9 in FIG. 12, a part of confidential process execution step).

In this exemplary embodiment, the transmission request, the user identification information, and the authentication information are transmitted as one message. For example, in the case where the communication protocol is CIFS, if path information "¥¥ServerA¥FolderA¥FileA" is included as information used for the transmission request generated in the confidential process P2 to specify the confidential information, the CPU transmits a message including path information "¥¥ServerA¥FolderA¥FileA #U2&1234" in which the user identification information "U2" and the authentication information "1234" are added to the path information.

It should be noted that the transmission request, the user identification information, and the authentication information may be transmitted while being divided into a plurality of messages.

Then, the CPU returns to the step 1005, and repeatedly performs processing from step 1005 to step 1025.

Figure 11:
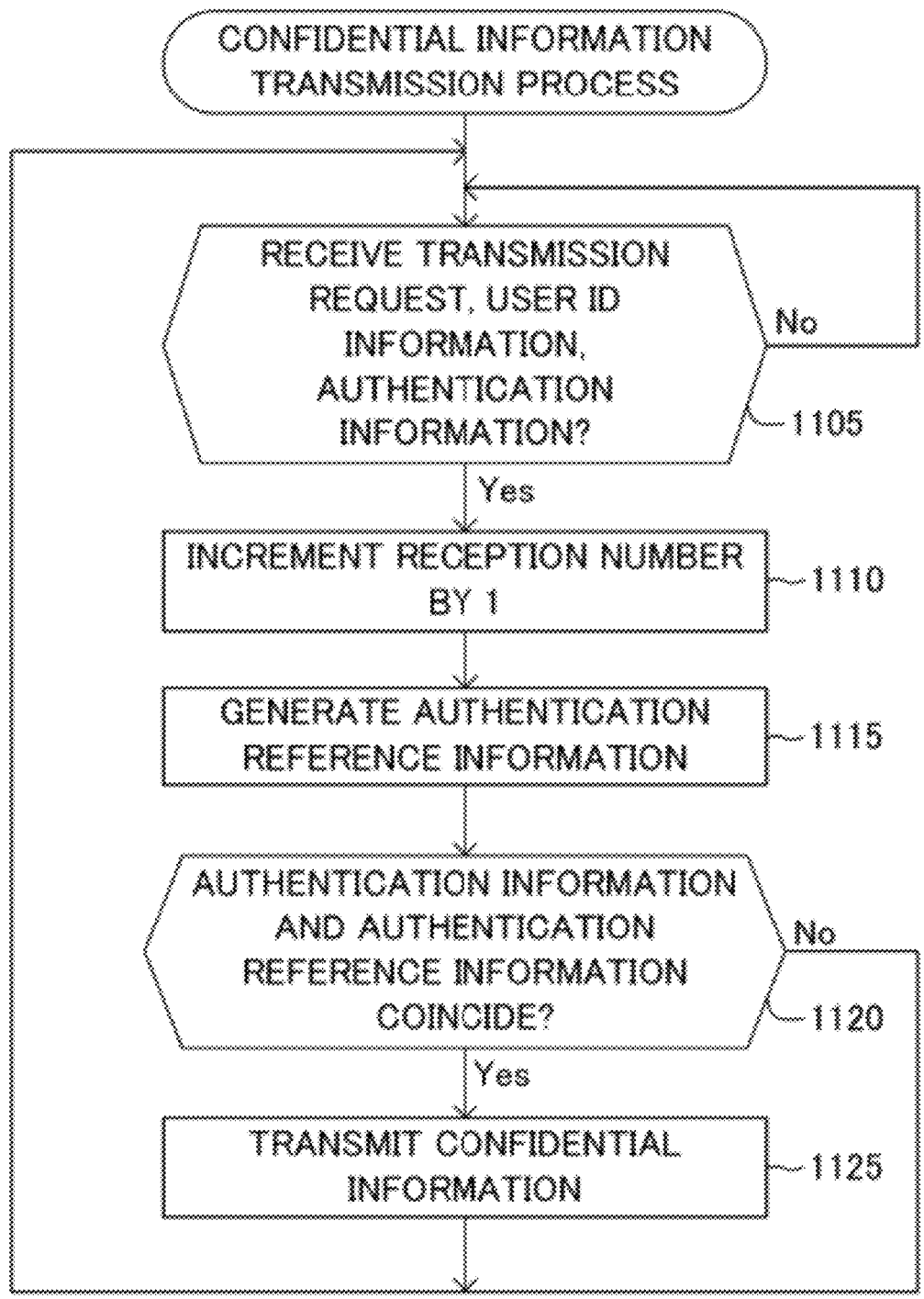
FIG. 11 is a flowchart showing a confidential information transmission processing program executed by the CPU of the server device shown in FIG. 1.

On the other hand, the CPU of the server device 20 is adapted to execute a confidential information transmission processing program, shown in the flowchart of FIG. 11, only once when the server device 20 is activated.

More specifically, when the CPU starts processing of the confidential information transmission processing program, at step 1105, the CPU waits until it receives the transmission request, the user identification information, and the authentication information from the client device 10.

Then, when the server device 20 receives the transmission request, the user identification information, and the authentication information, the CPU of the server device 20 determines to be "Yes" and goes to step 1110. Then, the CPU updates the reception number information, which is associated, in the reception number table, with the received user identification information and the device specifying information for specifying the client device 10 which transmitted the transmission request, such that the number of times indicated by the reception number information is incremented by one.

Then, the CPU acquires, as authentication base information, password information associated with the received user identification information in the user authentication table, and generates authentication reference information based on the acquired authentication base information and the updated reception number information (step 1115 in FIG. 11, step B4 in FIG. 12).

Then, the CPU performs process authentication processing for determining whether or not the received authentication information and the generated authentication reference information coincide with each other (which means whether or not the received authentication information is valid information) (step 1120 in FIG. 11, step B5 in FIG. 12, authentication processing step).

Now, description will be continued under the assumption that the received authentication information is valid information. In that case, the CPU determines to be "Yes" and goes to step 1125, and transmits confidential information stored in the storage device of the server device 20 to the client device 10, in accordance with the received transmission request (step B6 in FIG. 12, confidential information transmission step).

Then, the CPU returns to step 1105, and repeatedly performs processing from step 1105 to step 1125.

If the received authentication information is not valid information, the CPU determines to be "No" at step 1120 and returns to step 1105.

Then, the application program being executed as a confidential process generates data based on the confidential information received from the server device 20, and then generates a write request asking for storage of the generated data.

In this state, at step 1010, the CPU of the client device 20 determines to be "No" and goes to step 1030, and determines whether or not the generated processing request is a write request.

According to the assumption described above, the CPU determines to be "Yes" and goes to step 1035, and stores (writes) the data corresponding to the write request in the confidential region M2 of the store device of the client device 10 (write processing step). Then, the CPU returns to step 1005.

Next, description will be continued under the assumption that the application program being executed as a confidential process generates an ending request.

In that case, at step 1030, the CPU of the client device 10 determines to be "No" and goes to step 1040, and determines whether or not the generated processing request is an ending request.

According to the assumption described above, the CPU determines to be "Yes" and goes to step 1045, and erases the data stored in the confidential region M2 from the confidential region M2 (erase processing step). Then, the CPU ends execution of the confidential process request processing program, and then ends execution of the confidential process execution processing program.

It should be noted that if the generated processing request is none of a transmission request, a write request, and an ending request, the CPU determines to be "No" at step 1040 and returns to step 1005.

As described above, according to the first exemplary embodiment of the information processing system of the present invention, it is possible to transmit confidential process information from the client device 10 to the server device 20 without changing the application program. When the server device 20 receives confidential process information and a transmission request, the server device 20 transmits confidential information to the client device 10. Consequently, the server device 20 is able to properly respond to the transmission request from the client device 10. Specifically, the server device 20 is able to transmit confidential information from the server device 20 to the client device 10 only when the transmission request is generated by the confidential process P2.

Further, according to the first exemplary embodiment, after the confidential process P2 has ended, it is possible to prevent a state where the confidential information and/or the data generated based on the confidential information are continuingly stored in the storage device. This enables to prevent leakage of the confidential information and/or the data generated based on the confidential information from the client device 10.

In addition, according to the first exemplary embodiment, the server device 20 transmits confidential information to the client device 10 which transmitted true authentication information. Accordingly, it is possible to prevent that the server device 20 transmits confidential information to a client device which transmitted a transmission request in an unauthorized manner. This enables to prevent leakage of confidential information to an unauthorized client device.

Furthermore, according to the first exemplary embodiment, the client device 10 is adapted to transmit different information as authentication information each time it transmits a transmission request. Accordingly, even if authentication information is acquired by an unauthorized client device, it is possible to prevent the client device from acquiring confidential information in an unauthorized manner. This enables to prevent leakage of confidential information to an unauthorized client device.

Second Exemplary Embodiment

Next, an information processing system according to a second exemplary embodiment will be described. The information processing system of the second exemplary embodiment is different from the information processing system of the first exemplary embodiment in that confidential information is stored in a server device other than the server device 20. As such, in the below description, such difference will be mainly described.

Figure 13:
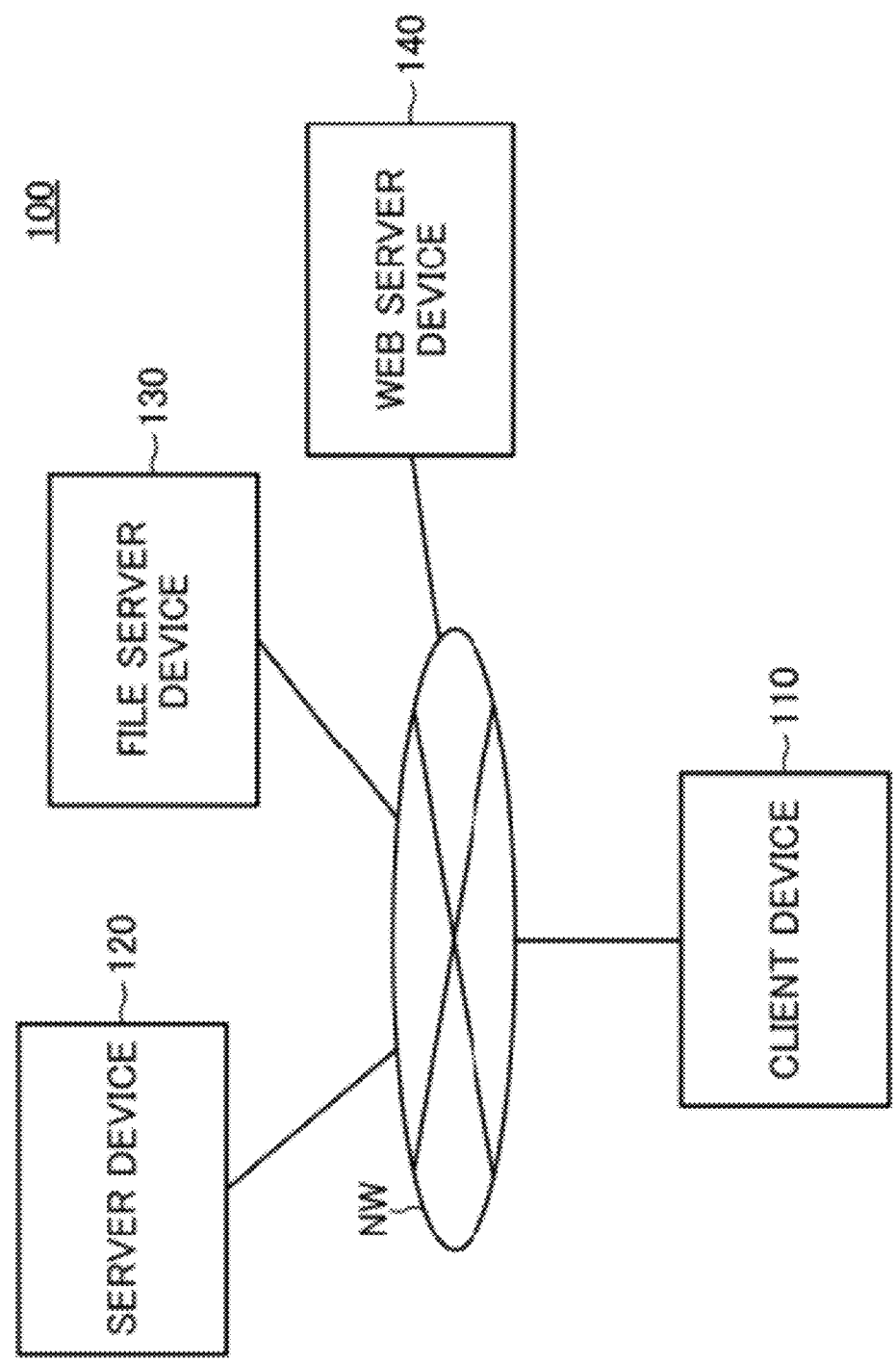
FIG. 13 is a diagram showing the schematic configuration of an information processing system according to a second exemplary embodiment of the present invention.
Figure 14:
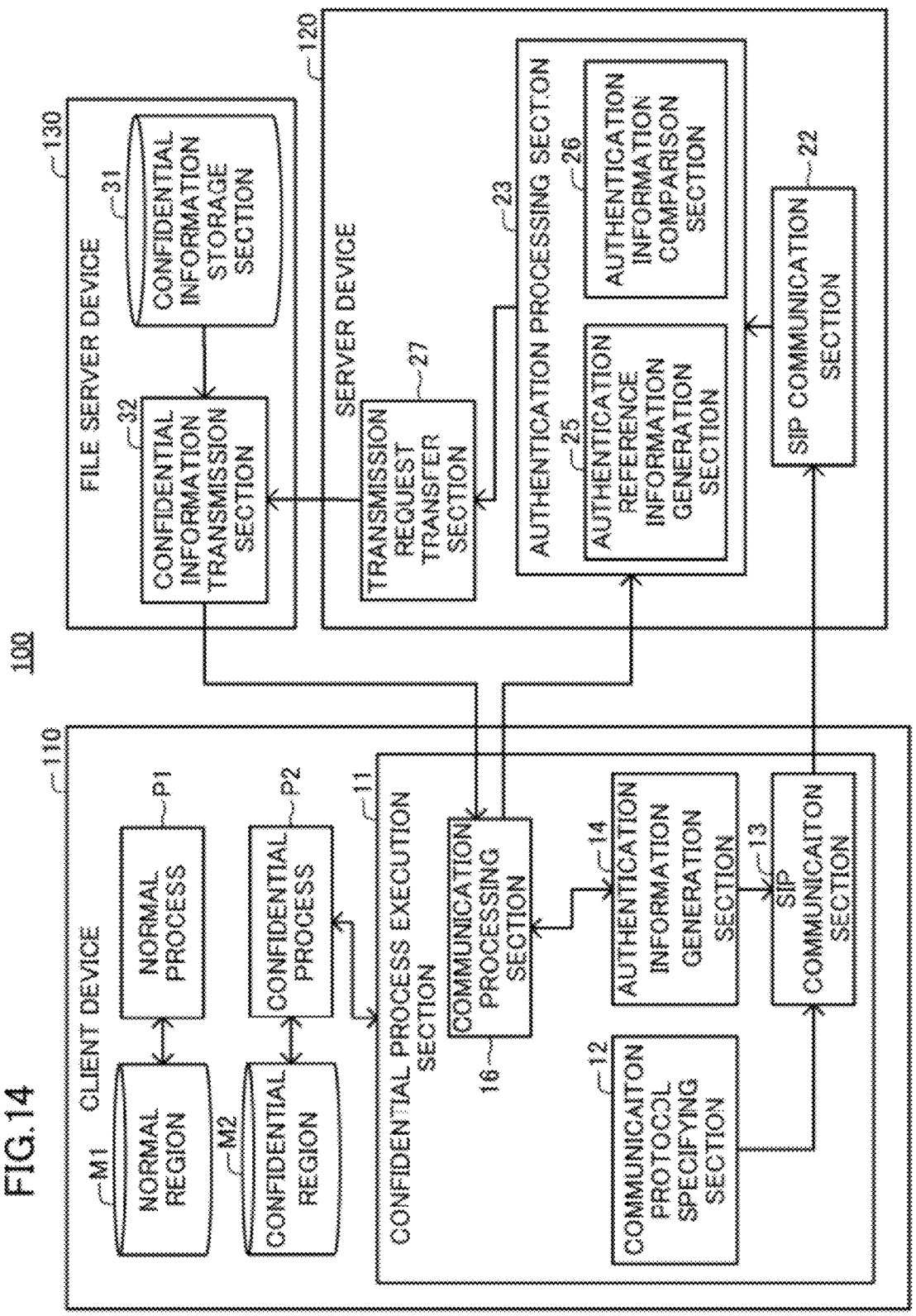
FIG. 14 is a block diagram showing the schematic functions of the information processing system shown in FIG. 13.

As shown in FIG. 13, an information processing system 100 according to the second exemplary embodiment includes a client device 110 which is the same as the client device 10, a server device 120 which is the same as the server device 20, a file server device 130, and a web server device 140. The server device 120, the file server device 130, and the web server device 140 constitute a server system.

The client device 110, the server device 120, the file server device 130, and the web server device 140 are communicably connected with each other over a communication network NW (intranet in this exemplary embodiment).

Each of the file server device 130 and the web server device 140 has the same configuration as that of the server device 120.

The functions of the client device 110 according to the second exemplary embodiment include, in place of the communication processing section 15, a communication processing section 16.

The communication processing section 16 is configured such that when a transmission request asking for transmission of confidential information stored in the file server device 130 or the web server device 140 is generated by an application program being executed as the confidential process P2, the communication processing section 16 transmits, to the server device 120, the transmission request, confidential process information indicating that the process in which the transmission request was generated is a confidential process, and user identification information received by the confidential process execution section 11.

In this exemplary embodiment, in the case where the communication protocol is CIFS, if the transmission request generated by the confidential process P2 includes path information "¥¥ServerB¥FolderA¥FileA" for specifying a file "FolderA¥FileA" as confidential information stored in the file server device 130 "ServerB", the communication processing section 16 adds user identification information "U2" and authentication information "1234" to the path information and changes the part indicating the destination server device from the file server device 130 "Server B" to the server device 120 "Server A". Then, the communication processing section 16 transmits a message including the changed path information "¥¥ServerA¥FolderA¥FileA#U2&1234" to the server device 120.

In this step, the communication processing section 16 uses a communication protocol which is the same as the communication protocol used by the application program. Further, in this exemplary embodiment, the communication process information is authentication information generated by the authentication information generation section 14.

Further, the communication processing section 16 updates transmission number information such that the number of times indicated by the transmission number information is incremented by one each time the communication processing section 16 transmits a transmission request. The communication processing section 16 transfers the confidential information received from the file server device 130 or the web server device 140 to the confidential process P2. It should be noted that the confidential process P2 may be configured to directly receive confidential information from the file server device 130 or the web server device 140 without taking a route through the communication processing section 16.

Further, the functions of the server device 120 includes a transmission request transfer section 27 in place of the confidential information storage section 21 and the confidential information transmission section 24.

The transmission request transfer section 27 associates, and stores in the storage device of the server device 20, communication protocol specifying information and transfer destination specifying information (in this exemplary embodiment, information indicating IP address) for specifying a server device which is a transfer destination of a transmission request.

When the authentication information comparison section 26 determines that the received authentication information is valid information, the transmission request transfer section 27 acquires communication protocol specifying information for specifying the communication protocol used for transmitting the received transmission request. Then, the transmission request transfer section 27 acquires transfer destination specifying information stored in associated with the acquired communication protocol specifying information.

Then, the transmission request transfer section 27 transmits (transfers) the received transmission request to the server device specified by the acquired transfer destination specifying information.

In this exemplary embodiment, if the communication protocol is CIFS, when the transmission request received by the server device 120 includes path information "¥¥ServerA¥FolderA¥FileA#U2&1234", the server device 120 transmits a message including path information "¥¥ServerB¥FolderA¥FileA" to the file server device 130.

Further, the functions of the file server device 130 include a confidential information storage section 31 and a confidential information transmission section 32. The confidential information storage section 31 stores confidential information in the storage device of the file server device 130. When the confidential information transmission section 32 receives a transmission request from the server device 120, it transmits, confidential information stored in the confidential information storage section 31 to the client device 10 in accordance with the received transmission request.

The web server device 140 also has the same functions as those of the file server device 130.

Figure 15:
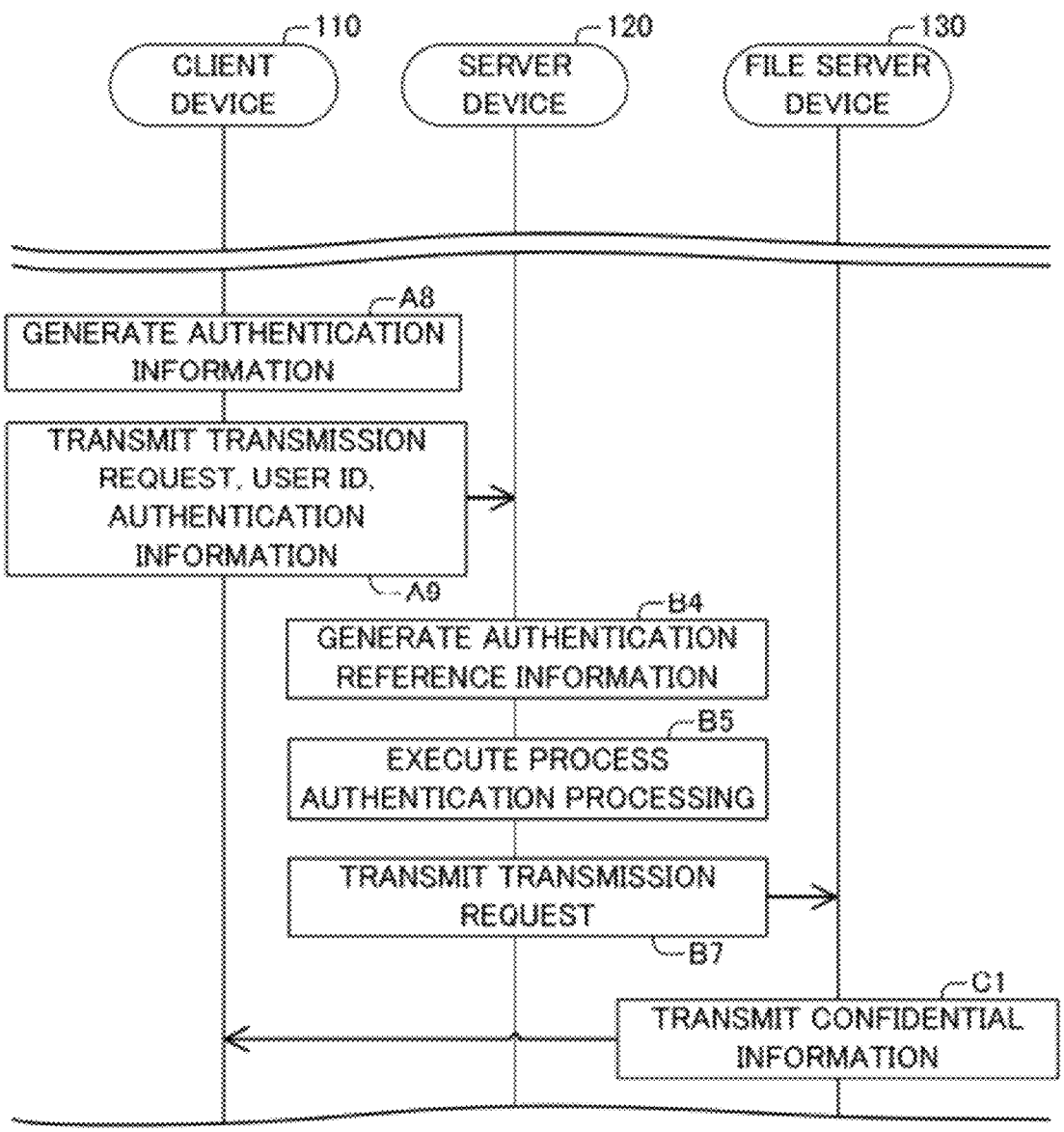
FIG. 15 is a sequence chart showing an operation of the information processing system shown in FIG. 13.

Next, an operation of the information processing system 100 configured as described above will be described with reference to the sequence chart shown in FIG. 15.

The communication processing system 100 operates in the same manner as the first exemplary embodiment up to step B5. Then, if the received authentication information is valid information, the server device 120 acquires a communication protocol specifying information for specifying the communication protocol used for transmitting the received transmission request. Then, the server device 120 acquires transfer destination specifying information which is stored in association with the acquired communication protocol specifying information.

Then, the server device 120 transmits (transfers) the received transmission request to the server device (in this exemplary embodiment, the file server device 130) specified by the acquired transfer destination specifying information (step B7).

When the file server device 130 receives the transmission request from the server device 120, the file server device 130 transmits confidential information stored in the storage device to the client device 10 (step C1).

Even in the second exemplary embodiment, operations and advantageous effects which are the same as those of the first exemplary embodiment can be achieved.

Third Exemplary Embodiment

Figure 16:
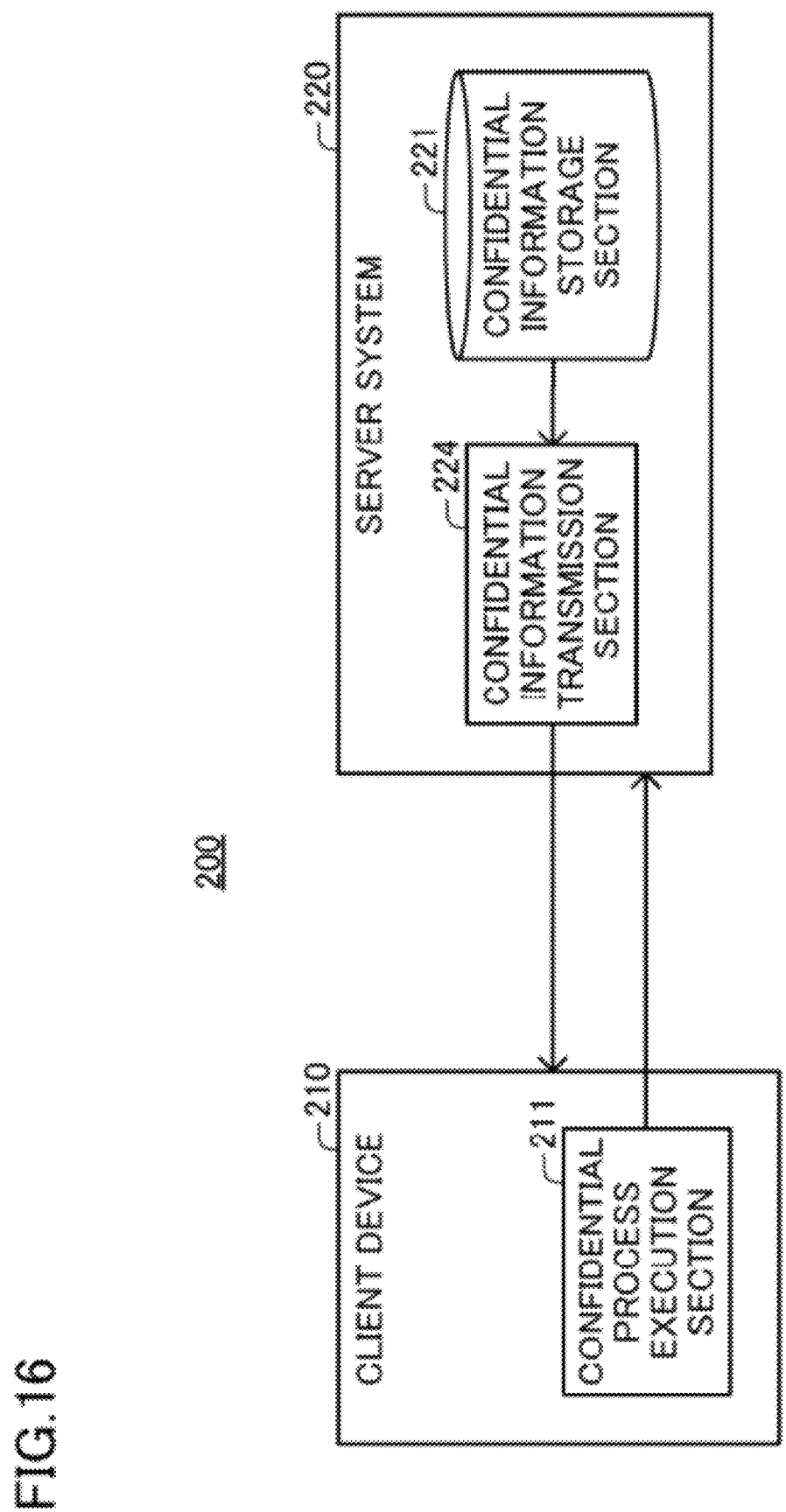
FIG. 16 is a block diagram showing the schematic functions of an information processing system according to a third exemplary embodiment of the present invention.

Next, an information processing system according to a third exemplary embodiment of the present invention will be described with reference to FIG. 16.

An information processing system 200 of the third exemplary embodiment includes a client device 210 and a server system 220.

The functions of the client device 210 include a confidential process execution section (confidential process execution unit) 211.

The confidential process execution section 211 executes an application program as a confidential process for performing processing based on confidential information. Further, when a transmission request asking for transmission of confidential information is generated by the application program being executed, the confidential process execution section 211 transmits the transmission request and confidential process information indicating that the process in which the transmission request was generated is a confidential process, to the server system 220.

The functions of the server system 220 include a confidential information storage section (confidential information storage unit) 221 and a confidential information transmission section (confidential information transmission unit) 224.

The confidential information storage unit 211 stores confidential information.

When the confidential information transmission unit 224 receives a transmission request and confidential process information from the client device 210, it transmits confidential information stored in the confidential information storage section 221 to the client device 210 in accordance with the received transmission request.

According to the third exemplary embodiment, it is possible to transmit confidential process information from the client device 210 to the server system 220 without changing the application program, as the exemplary embodiments described above. When the server system 220 receives confidential process information and a transmission request, the server system 220 transmits confidential information to the client device 210. As a result, the server system 220 is able to properly respond to the transmission request from the client device 210. For example, it is possible to transmit confidential information from the server system 220 to the client device 210 only when a transmission request is generated by the confidential process.

In that case, the confidential process execution unit is preferably adapted to, when a write request asking for storage of data is generated by the application program being executed as the confidential process, store the data in a confidential region of a storage device and erase the data stored in the confidential region when the confidential process is completed.

With this configuration, after the confidential process is completed, a state where the confidential information and/or data generated based on the confidential information are continuingly stored in the storage device can be prevented. This enables to prevent leakage of the confidential information and/or data generated based on the confidential information from the client device.

In that case, it is preferable that the confidential process execution unit is adapted to transmit authentication information as the confidential process information, that the server system includes an authentication processing unit which, when receiving authentication information transmitted from the client device, performs an authentication process for determining whether or not the received authentication information is valid information, and that the confidential information transmission unit is adapted to, when the authentication processing unit determines that the received authentication information is valid information, transmit the stored confidential information to the client device in accordance with the transmission request transmitted from the client device which transmitted the authentication information.

With this configuration, the server system transmits confidential information to the client device which transmitted true authentication information. As such, it is possible to prevent transmission of confidential information to a client device which transmitted a transmission request in an unauthorized manner. This enables to prevent leakage of the confidential information to unauthorized client devices.

In that case, the confidential process execution unit is preferably adapted to transmit different information as the authentication information each time it transmits the transmission request.

With this configuration, even if authentication information is acquired by an unauthorized client device, it is possible to prevent the client device from acquiring confidential information in an unauthorized manner. This enables to prevent leakage of the confidential information to unauthorized client devices.

In that case, it is preferable that the confidential process execution unit is adapted to generate authentication information based on authentication base information serving as the basis for generating the authentication information, and that the authentication processing unit is adapted to generate authentication reference information based on the authentication base information and to determine that the received authentication information is valid information when the generated authentication reference information and the authentication information coincide with each other.

In that case, it is preferable that the confidential process execution unit is adapted to transmit the authentication base information to the server system, and that the authentication processing unit is adapted to receive the authentication base information from the client device.

In that case, it is preferable that the confidential process execution unit is adapted to generate the authentication information based on the authentication base information and transmission number information indicating the number of times that the confidential process execution unit transmitted the transmission requests, and that the authentication processing unit is adapted to generate the authentication reference information based on the authentication base information and reception number information indicating the number of times that the server system received the transmission request.

In that case, it is preferable that the confidential process execution unit is adapted to transmit the authentication base information to the server system according to SIP (Session Initiation Protocol).

In that case, it is preferable that the confidential process execution unit is adapted to, before transmitting the transmission request, transmit to the server system protocol specifying information for specifying a communication protocol to be used for transmitting the transmission request, and that the confidential information transmission unit is adapted to, when receiving the protocol specifying information from the client device, transmit the confidential information in accordance with the transmission request transmitted according to the communication protocol specified by the received protocol specifying information.

In that case, it is preferable that the confidential process execution unit is adapted to transmit the protocol specifying information to the server system according to SIP (Session Initiation Protocol).

Further, a server system according to another aspect of the present invention includes a confidential information storage unit which stores confidential information, and a confidential information transmission unit which, when receiving a transmission request asking for transmission of the confidential information and confidential process information indicating that a process in which the transmission request was generated is a confidential process, transmits the stored confidential information in accordance with the received transmission request.

In that case, it is preferable that the server system includes an authentication processing unit which, when receiving authentication information as the confidential process information, determines whether or not the received authentication information is valid information, and that the confidential information transmission unit is adapted to, when the authentication processing unit determines that the received authentication information is valid information, transmits the stored confidential information in accordance with the transmission request received.

Further, a client device according to another aspect to the present invention includes a confidential process execution unit which executes an application program as a confidential process for performing processing based on confidential information, and when a transmission request asking for transmission of the confidential information is generated by the application program being executed, transmits the transmission request and confidential process information indicating that a process in which the transmission request was generated is a confidential process.

In that case, it is preferable that the confidential process execution unit is adapted to, when a write request asking for storage of data is generated by the application program being executed as the confidential process, store the data in a confidential region of a storage device and erase the data stored in the confidential region when the confidential process is completed.

In that case, it is preferable that the confidential process execution unit is adapted to transmit authentication information as the confidential process information.

Further, an information processing method according to another aspect of the present information includes executing an application program as a confidential process for performing processing based on confidential information, and when a transmission request asking for transmission of the confidential information is generated by the application program being executed, transmitting the transmission request and confidential process information indicating that a process in which the transmission request was generated is a confidential process, and when receiving the transmission request and the confidential process information, transmitting the stored confidential information in accordance with the received transmission request.

In that case, it is preferable that the information processing method further includes, when a write request asking for storage of data is generated by the application program being executed as the confidential process, storing the data in a confidential region of a storage device, and erasing the data stored in the confidential region when the confidential process is completed.

In that case, it is preferable that the information processing method further includes transmitting authentication information as the confidential process information, when receiving the authentication information, determining whether or not the received authentication information is valid information, and if it is determined that the received authentication information is valid information, transmitting the stored confidential information in accordance with the received transmission request.

Further, a program for a server device according to another aspect of the present invention is a program for realizing, in the server device, a confidential information transmission unit which, when receiving a transmission request asking for transmission of confidential information stored in a storage device and confidential process information indicating that a process in which the transmission request was generated is a confidential process, transmits the stored confidential information in accordance with the received transmission request.

In that case, it is preferable that the program further realizes, in the server device, an authentication processing unit which, when receiving authentication information as the confidential process information, performs an authentication process for determining whether or not the received authentication information is valid information, and that the confidential information transmission unit is adapted to, when the authentication processing unit determines that the received authentication information is valid information, transmit the stored confidential information in accordance with the received transmission request.

Further, a program for a client device according to another aspect of the present invention is a program for realizing, in the client device, a confidential process execution unit which executes an application program as a confidential process for performing processing based on confidential information, and when a transmission request asking for transmission of the confidential information is generated by the application program being executed, transmits the transmission request and confidential process information indicating that a process in which the transmission request was generated is a confidential process.

In that case, it is preferable that the confidential process execution unit is adapted to, when a write request asking for storage of data is generated by the application program being executed as the confidential process, store the data in a confidential region of the storage device, and erase the data stored in the confidential region when the confidential process is completed.

In that case, it is preferable that the confidential process execution unit is adapted to transmit authentication information as the confidential process information.

As inventions of server systems, client devices, information processing methods, programs for server devices, or programs for client devices; having the above-described configuration, have operations which are the same as those of the information processing systems described above, the object of the present invention can be achieved therein.

While the invention has been particularly shown and described with reference to exemplary embodiments thereof, the invention is not limited to those embodiments. It will be understood by those of ordinary skill in the art that various changes in form and details may be made therein without departing from the spirit and scope of the present invention as defined by the claims.

For example, although the respective functions of the information processing systems according to the exemplary embodiments are realized by the CPU executing the programs (software), they may be realized by hardware such as circuits.

Further, although the programs are stored in the storage devices in the respective exemplary embodiments, they may be stored (written) on storage media readable by CPU. The storage media are portable media including flexible disks, optical disks, magneto optical disks, and semiconductor memories, for example.

Further, as other variations of the exemplary embodiments, any combinations of the exemplary embodiments and variations may be adopted.

The present invention is applicable to information processing systems having server devices storing confidential information and client devices performing processing based on the confidential information received from the server devices, for example.

The invention claimed is:

1. An information processing system comprising:
a server system; and a client device configured to execute an application program as a normal process or a confidential process for performing processing based on confidential information, the client device including:
a normal process execution unit for executing the application program as the normal process, the normal process execution unit which, when a write request asking for storage of data is generated by the application program executed as the normal process, stores the data in a normal region of a storage device; and
a confidential process execution unit for executing the application program as the confidential process, the confidential process execution unit which, when a write request asking for storage of data is generated by the application program executed as the confidential process, stores the data in a confidential region being different from the normal region in the storage device, and erases the data stored in the confidential region when the confidential process ends,
wherein the confidential process execution unit is adapted to, when a transmission request asking for transmission of the confidential information is generated by the application program being executed as the confidential process, transmit the transmission request and confidential process information indicating that a process in which the transmission request was generated is a confidential process, to the server system;
the confidential process execution unit is adapted to generate authentication information based on authentication base information and transmission number information indicating number of times that the confidential process execution unit transmitted the transmission request; and
wherein the server system includes:
a confidential information storage unit which stores the confidential information;
an authentication processing unit is adapted to generate authentication reference information based on the authentication base information and reception number information indicating the number of times that the server system received the transmission request; and
a confidential information transmission unit which, when receiving the transmission request and the confidential process information from the client device, transmits the confidential information stored in the confidential information storage unit to the client device in accordance with the transmission request received.

2. The information processing system according to claim 1, wherein the confidential process execution unit is adapted to transmit the transmission request and the confidential process information as one message to the server system.

3. The information processing system according to claim 1, wherein
the confidential process execution unit is adapted to transmit authentication information as the confidential process information, and
the server system includes an authentication processing unit which, when receiving the authentication information transmitted from the client device, performs an authentication process for determining whether or not the received authentication information is valid information, and
the confidential information transmission unit is adapted to, when the authentication processing unit determines that the received authentication information is valid information, transmit the stored confidential information to the client device in accordance with the transmission request transmitted from the client device which transmitted the authentication information.

4. The information processing system according to claim 3, wherein the confidential process execution unit is adapted to transmit different information as the authentication information each time the confidential process execution unit transmits the transmission request.

5. The information processing system according to claim 3, wherein
the confidential process execution unit is adapted to generate the authentication information based on authentication base information serving as a basis for generating the authentication information, and
the authentication processing unit is adapted to generate authentication reference information based on the authentication base information and to determine that the received authentication information is valid information when the generated authentication reference information and the authentication information coincide with each other.

6. The information processing system according to claim 5, wherein
the confidential process execution unit is adapted to transmit the authentication base information to the server system, and
the authentication processing unit is adapted to receive the authentication base information from the client device.

7. The information processing system according to claim 6, wherein the confidential process execution unit is adapted to transmit the authentication base information to the server system according to SIP (Session Initiation Protocol).

8. The information processing system according to claim 1, wherein
the confidential process execution unit is adapted to transmit protocol specifying information for specifying a communication protocol to be used for transmitting the transmission request before transmitting the transmission request, and
the confidential information transmission unit is adapted to, when receiving the protocol specifying information from the client device, transmit the confidential information to the client device in accordance with the transmission request transmitted according to the communication protocol specified by the protocol specifying information received.

9. The information processing system according to claim 8, wherein the confidential process execution unit is adapted to transmit the protocol specifying information to the server system according to SIP (Session Initiation Protocol).

10. An information processing method comprising:
executing an application program as a normal process or a confidential process for performing processing based on confidential information,
wherein:
when a write request asking for storage of data is generated by the application program executed as the normal process, storing the data in a normal region of a storage device, when a write request asking for storage of data is generated by the application program executed as the confidential process, storing the data in a confidential region being different from the normal region in the storage device and erasing the data stored in the confidential region when the confidential process ends, when a transmission request asking for transmission of the confidential information is generated by the application program being executed as the confidential process, transmitting the transmission request and confidential process information indicating that a process in which the transmission request was generated is a confidential process, when receiving the transmission request and the confidential process information, transmitting a stored confidential information in accordance with the transmission request received, and generating authentication information based on authentication base information and transmission number information indicating number of times that the transmission request was transmitted; and generating authentication reference information based on the authentication base information and reception number information indicating the number of times that a server system received the transmission request.

11. The information processing method according to claim 10, further comprising transmitting the transmission request and the confidential process information as one message.

12. The information processing method according to claim 10, further comprising:

transmitting authentication information as the confidential process information;

when receiving the authentication information, determining whether or not the received authentication information is valid information; and when it is determined that the received authentication information is valid information, transmitting the stored confidential information in accordance with the transmission request received.

13. An information processing system comprising:

a server system; and a client device configured to execute an application program as a normal process or a confidential process for performing processing based on confidential information, wherein the client device includes:

a normal process execution means for executing the application program as the normal process, the normal process execution means which, when a write request asking for storage of data is generated by the application program executed as the normal process, stores the data in a normal region of a storage device; and a confidential process execution means for executing the application program as the confidential process, the confidential process execution means which, when a write request asking for storage of data is generated by the application program executed as the confidential process, stores the data in a confidential region being different from the normal region in the storage device and erases the data stored in the confidential region when the confidential process ends, and wherein the confidential process execution means is adapted to, when a transmission request asking for transmission of the confidential information is generated by the application program being executed as the confidential process, transmit the transmission request and confidential process information indicating that a process in which the transmission request was generated is a confidential process, to the server system;

the confidential process execution means for generating authentication information based on authentication base information and transmission number information indicating the number of times that confidential process execution means transmitted the transmission request; and wherein the server system includes:

a confidential information storage means which stores the confidential information;

an authentication processing means for generating authentication reference information based on the authentication base information and reception number information indicating the number of times that the server system received the transmission request; and a confidential information transmission means which, when receiving the transmission request and the confidential process information from the client device, transmits the confidential information stored in the confidential information storage means to the client device in accordance with the transmission request received.

* * * * *